July 10, 1934. J. J. SEITZ 1,965,672
DOOR RETAINER
Filed Sept. 19, 1930
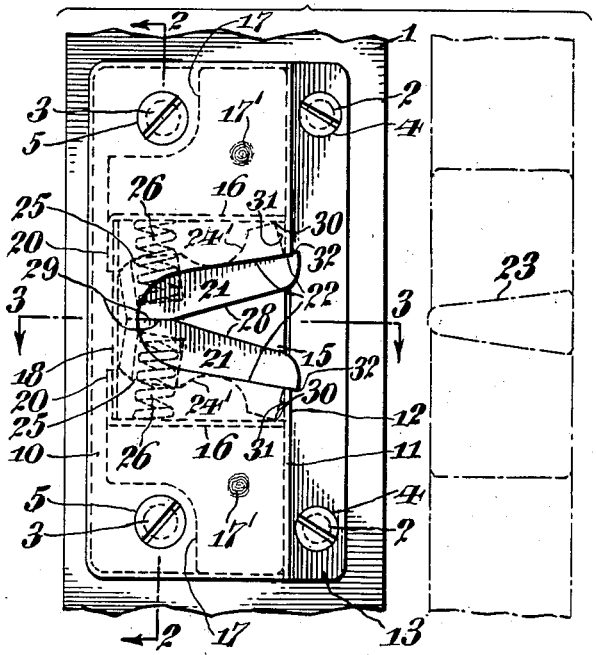
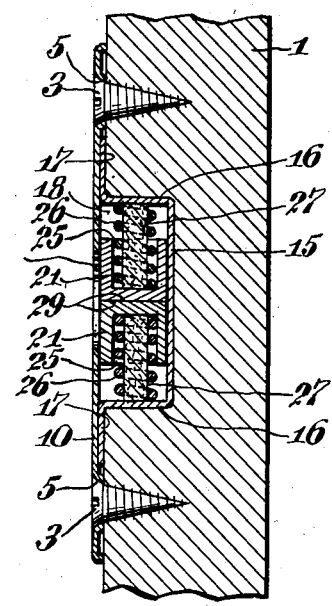
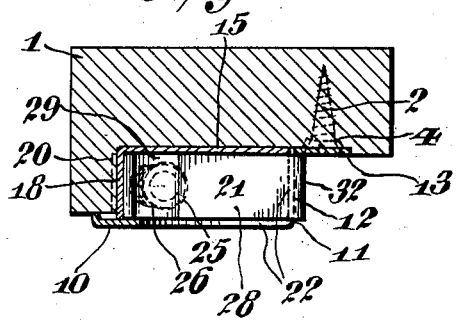
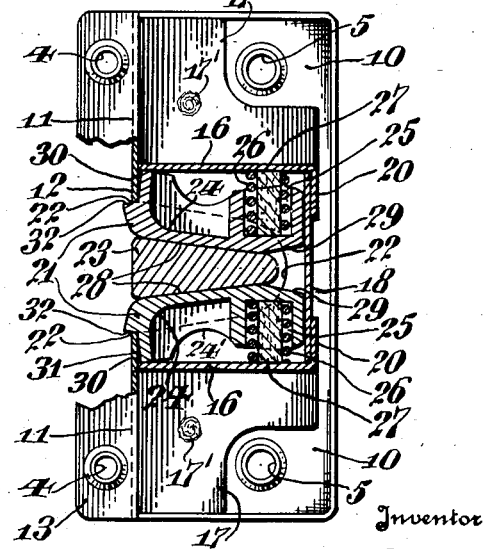
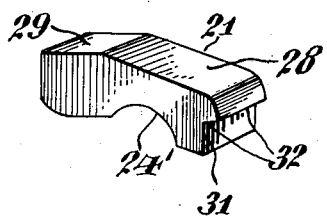
Inventor
Joseph J. Seitz
By Cyrus N. Anderson
Attorney Patented July 10, 1934

1,965,672

UNITED STATES PATENT OFFICE 1,965,672

DOOR RETAINER

Joseph J. Seitz, Philadelphia, Pa., assignor to Mitchell Specialty Company, Philadelphia, Pa., a corporation of Pennsylvania Application September 19, 1930, Serial No. 482,964

17 Claims. (Cl. 16—85)

My invention relates to door retainers of the character commonly known in the trade as "dovetails" and which are employed for holding the outer or swinging portions of doors, such as automobile doors, when in closed position, against vibration relatively to the frame of the automobile or other structure to thereby prevent rattling and annoying sounds which, if vibration were permitted, would be occasioned.

The general object of the invention is to provide a door retainer of simple construction having means which acts not only to prevent vibration and rattling of the door of an automobile or the like when in closed position and during operation of the automobile but it also acts or tends to cause opening movement of the door when the fastening means for retaining the same in closed position is released.

It also is an object of the invention to provide a retainer including a holder having bearing or engaging members therein, parts of which are seated against and in rocking relation to oppositely disposed parts or portions of the said holder.

Another object of the invention is to provide a retainer including means of novel construction for facilitating the removal of the bearing or engaging members contained therein.

Other objects and advantages of the invention will be pointed out in the detailed description thereof which follows or will be apparent from such description.

In order that the invention may be readily understood and its practical advantages fully appreciated reference should be had to the accompanying drawing wherein I have illustrated one embodiment of the invention. However, it will be understood that the invention may be embodied in other forms of construction than that shown and that changes in the details of construction may be made within the scope of the claims without departing from the invention or the principle thereof.

In the drawing:

Fig. 1 is a view in elevation of the inside edge of a portion of the door frame of an automobile or other structure provided with a door retainer embodying the invention, the said view also showing in dash and dot lines an edge portion of a door having thereon the tongue or lug which is adapted to enter and to co-operate with the said retainer;

Fig. 2 is a vertical sectional view taken on the line 2—2 of Fig. 1;

Fig. 3 is a transverse sectional view taken on the line 3—3 of Fig. 1;

Fig. 4 is a view partly in inside elevation and partly in section of the retainer shown in the preceding figures of the drawing, the said section being taken in a plane parallel with the planes of the opposite sides of the said retainer; and Fig. 5 is a view in perspective of one of the members of the retainer which engages the entering tapered or wedge-shaped member which usually is carried upon the outer swinging edge of the door which is to be held against vibration relatively to other portions of the structure to thereby prevent rattling noises.

Referring to the drawing I have shown at 1 a portion of the upright member of one side of the frame of a door opening for an automobile or other like structure. The door retainer or receiving member of the anti-rattling device embodying my invention is mounted upon the upright 1 of the frame of the door opening, being secured thereto by means of fastening screws 2 and 3 which extend through openings 4 and 5 provided through portions of the retainer.

In the construction as illustrated the retainer comprises a casing consisting of an outer plate 10 which is bent as shown at 11 to provide a front edge wall 12. The inner edge of the wall 12 is bent laterally and extended to form a flange 13 within which the openings 4 are provided for the fastening screws 2. The opposing inner side of the casing consists of a plate having a central portion 15 which portion is joined at its opposite ends to inwardly bent and extending portions 16 which terminate in outwardly extending portions 17 which are secured to the under side of the main portion of the opposing plate 10 of the device by spot welding as indicated at 17' or by any other means, as by screws, rivets or the like. The portions 16 constitute end walls which practically are at right angles or approximately so to the portion 15, as is clearly shown in Fig. 2 of the drawing. The rear edge of the central or intermediate portion 15 of the inner plate is extended and bent outwardly to form a flange 18 at the rear edge of the retainer and constituting the rear wall of the casing thereof. The rear ends of the portions 16 of the inner plate are provided with projections 20 which are bent inwardly of the retainer toward each other, as shown in Fig. 4 of the drawing, to overlie the opposite end portions of the rear wall 18 of the casing. The inner plate, comprising the portion 15 and the opposing end portions 16, constitutes the holder or the retainer for the bearing members 21. In the construction as illustrated the outer plate co-operates with the inner plate to form a casing but it may happen in the use of the device that a separate plate such as 10 need not be employed in the original construction thereof, but, for example, the holder referred to as comprising portions 15 and 16 of the inner plate may be covered over by a properly formed and shaped edge portion of a side plate of the body of the car or other structure. The presence of such edge portion would in effect constitute with the plate comprising the portions 15 and 16 a casing. At any rate the presence of such plate or other covering plate such as the plate 10 would operate to conceal the interior of the holder or retainer.

The front edge portion of the cover plate, designated 10 in the construction as illustrated, is provided with a notch or opening 22.

Portions of the adjoining or opposing sides of the members 21 engage or are adapted to engage the wedge-shaped member 23 carried by the outer swinging edge of the door, shown in dash and dot lines in Fig. 1 of the drawing. It should be understood that the positions of the parts may be reversed; that is, the wedge 23 may be mounted upon the frame member 1 while the retainer or receiving member may be mounted upon the door and movable therewith.

Each of the engaging members 21 of the retainer or receiving member of the structure consists of a block-like part, the outer side of which has a recess 24 therein which is provided for the sake of lightness and also economy in the amount of metal used, and the walls on opposite sides of said recess are provided with notches 24'. The outer side of each member also is slightly concaved as shown in Figs. 4 and 5. The outer sides of the rear end portions of the members 21 are provided with recesses 25 which constitute seats for the inner ends of coiled springs 26, the opposite outer ends of which are seated against the inner sides of the walls 16 in adjoining relation to the rear ends thereof. The tendency of the said springs is to expand and cause movements of the rear ends of the members 21 inwardly or toward each other to effect contact thereof when the wedge-shaped tongue member 23 is out of engagement with said members, as is shown in Fig. 1 of the drawing.

For the purpose of maintaining the coiled springs 26 and adjoining portions of the holder therefor in lubricated condition, I provide short wicks 27 of any suitable material within the coils of the springs 26, which wicks extend into the recesses 25. By thus providing means for lubricating the coils of wire and adjoining portions of the retainer I prevent squeaking noises which otherwise might occur.

To facilitate the entry of the wedge-shaped tongue member 23 between the bearing members 21 and into the retainer the inner opposing surfaces of the front end portions of the said member are divergently related to each other, as shown at 28 in the drawing. The inner opposing surfaces 29 of the rear end portions of the said members are inclined or angularly related to the surfaces of the front end portions, the said surface portions 29 contacting with each other, as shown in Fig. 1, when the tongue member 23 is disengaged therefrom.

The outer edges of the front ends of the members 21 contact, as indicated at 30, with the end walls 16 in adjoining relation to the front ends of the latter so that when the wedge-shaped tongue member 23 enters and leaves the space between the members 21 the latter rock upon their points of contact at 30 with the end walls 16. The front ends of the members 21 which contact with the end walls 16 are held positively against spreading movement so that in use when the tapered member 23 is in engagement with the members 21 the front portion of said member 23 is wedged between the front unyielding ends of the said members 21.

It will be apparent that as the wedge-shaped tongue member 23 enters between the opposing faces of the bearing and holding members 21 to effect rocking movement thereof about their points of contact at 30 the springs 26 are compressed. The amount of compression varies with the extent of entry of the wedge 23 between the members 21 and in consequence the pressure exerted by the said springs is increased as the extent of such entry increases. The compression of the springs upon the members 21 tending to move the rear ends thereof inwardly or toward each other tends also to cause outward or disengaging movement of the wedge-shaped tongue 23 from the said members. Such tendency is due, in part at least, to the angular, divergent relationship between the inner opposing surfaces of the front end portions of the members 21. Such outward or disengaging movement, however, is prevented by the usual fastening catch by which the door is retained in closed position. Such pressure exerted by the springs being continuous operates to hold the members 21 with relatively great force at all times in contact with and in holding relation to the opposite tapered sides of the tongue 23, the result being to prevent or reduce to a minimum vibration or movement of the door relative to associated and co-operating parts of the automobile or other structure. Rattling and noises are thereby prevented or reduced to a minimum. When the catch is released the expansive force of the springs 26 functions through the members 21 and 23 to cause or tend to cause initial opening movement of the door.

It will be seen that a retainer of the construction illustrated embodying my invention is positive and efficient in its action and that the construction is such that there is no possibility of inefficiency of action due to wear of the parts. If by any chance the springs 26, or either of them, should break or become weakened they, or either of them, may be removed and a new spring substituted therefor.

In order to facilitate removal of the bearing members 21 from the holder after the latter is covered over by the plate 10 or other covering I have provided the front ends of said bearing members with cut out portions or notches, as indicated at 31, which provide shoulders 32 which project slightly beyond the front side of the front edge wall 12 of the plate 10 or its equivalent. For the purpose of removing the bearing members 21 from the retainer the projecting shoulders 32 may be engaged and the front ends of the said members pushed inwardly so as to disengage the outer front end portions thereof from underneath the portions of the front edge wall 12 in adjoining relation to the opening 22 therein. The said bearing members or either of them having been thus pushed inwardly may be removed readily from the holder together with the springs 26.

Having thus described my invention what I claim and desire to secure by Letters Patent is:

1. A door retainer comprising two cooperating members the front end portions of which are spaced from each other, the inner opposing sides of said portions being divergently related to each other for the reception of a tapered third member, unyielding means with which the outer edges of the front end portions of said two cooperating members are in contact, the said outer ends being thereby held against movement away from each other, coiled springs having their inner ends seated against the outer sides of the rear end portions of the said two cooperating members, the said springs pressing the said rear end portions toward each other, and unyielding means against which the outer ends of said springs are seated.

2. A door retainer comprising a casing providing a chamber having end walls, two cooperating members located in said chamber, the outer edges of the front ends of said members contacting with the inner sides of said end walls near their front ends, and yielding resilient means located between the rear end portions of said end walls and the rear end portions of said cooperating members and pressing the rear end portions of said members toward each other.

3. A door retainer comprising two cooperating bearing members, unyielding supports against which the outer edges of the front ends of the said members are rockingly seated, the inner opposing sides of the front end portions of said members being spaced from and divergently related to each other, and resilient yielding means acting against the outer sides of the rear end portions of said members and pressing the same with yielding force toward each other.

4. A door retainer comprising a casing providing a chamber having end walls, two cooperating members located in said chamber in adjoining relation to said walls and extending in general parallel relation to said walls, the outer edges of the front ends of said two cooperating members being rockingly seated against the inner sides of said end walls near their front ends, the inner sides of the front end portions of said two cooperating members being spaced from and divergently related to each other for the reception of a tapered third member, the outer sides of the said two cooperating members having recesses therein, and coiled springs located between the rear end portions of said two cooperating members and the rear end portions of the said end walls, the inner ends of said coiled springs being seated in the said recesses and the outer ends thereof being seated against the rear portions of the said end walls, the said springs being under compression and pressing the rear end portions of said co-operating members toward each other.

5. A door retainer comprising a holder, bearing members mounted within said holder and adapted to engage a member which may be inserted between the same, the outer edges of the front end portions of said bearing members being seated against parts of said holder and adapted to rock thereon, the outer sides of the inner end portions of the said bearing members having recesses therein, and coiled springs mounted in said recesses and bearing against portions of the said holder.

6. A door retainer comprising a holder having end walls, bearing members mounted within said holder, the inner sides of the front end portions of which are divergently related to each other and the outer sides of which are provided in adjoining relation to their rear ends with recesses and the outer edges of the front ends of said members being in contact with the front end portions of the said end walls in adjoining relation to their front ends, and yielding means mounted within the said recesses and contacting with adjoining portions of the said end walls, said yielding means exerting pressure against the rear ends of said members and tending to move the same inwardly.

7. A door retainer comprising a holder, bearing members mounted in said holder in opposing co-operative relation to each other, the surfaces of the rear and front end portions of the opposing sides of said members being angularly related to each other, the outer edges of the front end portions of said members contacting with parts of said holder and being thereby prevented from moving outwardly with relation to each other, and springs located between the outer sides of the rear end portions and adjoining parts of said holder, the said springs being under compression and tending to hold the rear end portions of said members in contact with each other and the front end portions of said members spaced from each other.

8. A door retainer comprising a holder having a front edge wall provided with an opening therethrough, bearing members mounted within said holder in adjoining opposed relation to each other, the front end portions of said bearing members being cut away to form shoulders which project through said opening, and springs mounted in the said holder and engaging the outer sides of the rear ends of the said bearing members to press the said ends toward each other.

9. A door retainer comprising a holder having end walls and a front edge wall the latter being provided with an opening therethrough, bearing members mounted in said holder with their inner sides in adjoining opposing relation to each other, the outer edges of the front ends of said bearing members contacting with the said end walls and the front ends of said bearing members having portions cut away to form shoulders which project through the said opening in adjoining relation to the opposite edges thereof, and yielding resilient means located between the outer sides of the rear ends of said bearing members and the opposing end walls of said holder, said yielding resilient means being under compression and exerting pressure to force the rear ends of said members toward each other.

10. A door retainer comprising a pair of opposed cooperating members having bearing surfaces on their opposing sides, the bearing surface of one of said members having portions angularly disposed with respect to each other, and means acting on one of said members with yielding force and normally forcing corresponding portions of said bearing surfaces against each other whereby the other portions of said bearing surfaces are held in divergent relation for the reception of a tapered third member therebetween.

11. A door retainer comprising a pair of opposed cooperating members having bearing surfaces on their opposing sides, the bearing surface of each member having its front and rear portions angularly disposed with respect to each other, the said members being also provided with second bearing surfaces adjacent their front ends, supports upon which said second bearing surfaces are adapted to rock, and means acting on said members with yielding force at the rear ends thereof and normally both forcing the rear portions of said first mentioned bearing surfaces against each other and spreading apart the front ends of said members to hold said second bearing surfaces in rocking engagement with said supports and to hold the front portions of said first mentioned bearing surfaces in divergent relation for the reception of a tapered third member therebetween.

12. A door retainer comprising a pair of opposed cooperating members having bearing surfaces on their opposing sides, the bearing surface of each member having its front and rear portions angularly disposed with respect to each other and meeting in a projecting angle, and means acting with yielding force upon the rear ends of said members rearwardly of the apexes of said projecting angles and normally forcing the apexes of said angles against each other and the rear portions of the bearing surfaces toward each other.

13. A door retainer comprising a pair of opposed cooperating members having bearing surfaces on their opposing sides, the bearing surface of each member having its front and rear portions angularly disposed with respect to each other and meeting in a projecting angle, the said members being also provided with second bearing surfaces adjacent their front ends, supports upon which said second bearing surfaces are adapted to rock, and means acting with yielding force on the rear ends of said members rearwardly of the apexes of said projecting angles and normally forcing the apexes of said angles against each other and the rear portions of said first mentioned bearing surfaces toward each other and spreading apart the front ends of said members to hold said second bearing surfaces in rocking engagement with said supports and to hold the front portions of said first mentioned bearing surfaces in divergent relation for the reception of a tapered third member therebetween.

14. A door retainer comprising a pair of opposed cooperating members having on their opposing sides bearing surfaces, the front portions of which normally diverge from a point of contact with each other, and means acting with yielding force on said members rearwardly of the said normal point of contact of said divergent surfaces and forcing the rear portions of said members toward each other.

15. A door retainer comprising a casing having an opening in one wall thereof for receiving a wedge member, a pair of rigid bearing members movably mounted in said casing for engagement with the wedge member, said bearing members being smaller than said opening to enable them to be inserted and removed therethrough, stop means on said casing, resilient means for resisting movement of the rear ends of said bearing members away from each other, and means on said bearing members, disengageable from said stop means by movement of the front ends of said bearing members in a direction lengthwise of said opening, for normally retaining said bearing members in said casing.

16. In a door retainer, a casing having an opening in one wall thereof to receive a wedge member, a pair of relatively movable rigid bearing members mounted in said casing for engagement with the wedge member, said opening being larger than one bearing member to enable it to be inserted and removed therethrough, cooperating stop means on said casing and said one bearing member for normally retaining said member in said casing, said stop means being disengageable by movement of the front end of said bearing member toward the other bearing member, and resilient means for opposing relative movement of the rear ends of said members away from each other.

17. In a door retainer, a casing having an opening therein to receive a wedge member, a pair of rigid bearing members loosely mounted in said casing, said bearing members being smaller than said opening to enable them to be inserted and removed therethrough, and resilient means for opposing movement of the rear ends of said members away from each other and for normally retaining the front ends of said members spaced from each other to receive the wedge member.

JOSEPH J. SEITZ.